United States Patent [19]

Savard

[11] Patent Number: 5,012,842

[45] Date of Patent: May 7, 1991

[54] FLUID ACTUATED PIPE CLAMP TIGHTENER

[75] Inventor: Donald D. Savard, Edmonton, Canada

[73] Assignee: Interprovincial Pipe Line Company, Edmonton, Canada

[21] Appl. No.: 581,955

[22] Filed: Sep. 13, 1990

Related U.S. Application Data

[63] Continuation-in-part of Ser. No. 458,257, Dec. 28, 1989.

[51] Int. Cl.⁵ .................................................. F16L 55/16
[52] U.S. Cl. ........................... 138/161; 138/99; 24/68 CT; 59/93
[58] Field of Search .................. 138/99, 110, 97, 147, 138/157, 161; 24/19, 68 CT, 69 T, 69 WT, DIG. 26; 29/402.09, 402.14; 59/78, 78.1, 88, 93

[56] References Cited

U.S. PATENT DOCUMENTS

| | | | |
|---|---|---|---|
| 1,971,649 | 8/1934 | Furman et al. | 138/99 |
| 2,182,258 | 12/1939 | Kirk | 138/99 |
| 2,586,057 | 6/1971 | Lambert | 138/99 |
| 4,057,082 | 11/1977 | King | 138/99 |
| 4,172,472 | 10/1979 | Parrish | 138/99 |
| 4,535,822 | 8/1985 | Rogers | 138/99 |

FOREIGN PATENT DOCUMENTS 360126  6/1938  Italy .................................... 138/99

Primary Examiner—James E. Bryant, III
Attorney, Agent, or Firm—Millen, White & Zelano

[57] ABSTRACT

The tightener comprises a scissor clamp having first and second arms pivotally connected at their upper ends. At their lower ends, the arms are pivotally connected with the ends of a loop of chain that encircles a pair of semi-circular steel shells encircling a pipeline. The rod of a cylinder is pivotally connected to move the front arm toward the rear arm. The cylinder is positioned to operate generally perpendicularly relative to the arms.

2 Claims, 2 Drawing Sheets

FLUID ACTUATED PIPE CLAMP TIGHTENER

CROSS-REFERENCE

This application is a continuation-in-part of co-pending patent application Ser. No. 07/458,257 filed Dec. 28, 1989.

BACKGROUND OF THE INVENTION

In my co-pending application, whose disclosure is hereby incorporated by reference, I teach a sleeve assembly for repairing a leak in the wall of a steel pipeline for conveying oil. This assembly involves mounting a pair of semi-circular steel shells around the line and tightening or pressing them into load-applying engagement with the circular pipe wall. One of the shells carries a protruding annular seal member which seats in a recess formed by the inner surface of the shell. The seal member surrounds the leaking aperture and seals around it to prevent fluid escape between the shell and the pipe. Once the seal member has sealed, the stressed shells are welded longitudinally to create a permanent, full encirclement sleeve.

In connection with tightening the shells against the pipe it is desirable:
That, as much as possible, the load being applied by the tightener be distributed uniformly to the shells. If the load is relatively concentrated at a point, there is a risk of denting the sleeve and pipe;
That the tightener used be adapted for use with shells and pipe of different curvatures or diameter; and
That the tightener is powered by a fluid cylinder so that the extent of loading may conveniently be monitored.

SUMMARY OF THE INVENTION

In accordance with the invention, there is provided:
a scissor clamp having arms pivoted at a first end and having means at the second end for engaging the two ends of a chain loop; and
a fluid-actuated cylinder disposed substantially perpendicularly to the arms when the latter are together, said cylinder carrying a support plate at one end, the rear surface of the clamp's first arm abutting the support plate, the cylinder being connected to the clamp's second arm between its ends, whereby the cylinder may bias the second arm toward or away from the supported first arm.

Preferably the abutting portions of the first arm rear surface and the support plate front surface have a concave/convex conformance, so that the first arm remains well supported as the clamp arms pivot between open and closed positions with the chain tensioned.

The chain can be lengthened or shortened to leave a gap between its ends, when the chain is taut, which gap is about equal to the spacing between adjacent chain pins. As a result, the radial loading applied against the shells and pipe by the undersurface lobes of the chain is substantially uniformly distributed about the circumference of the sleeve formed by the shells.

DESCRIPTION OF THE PREFERRED EMBODIMENT

Figure 1:
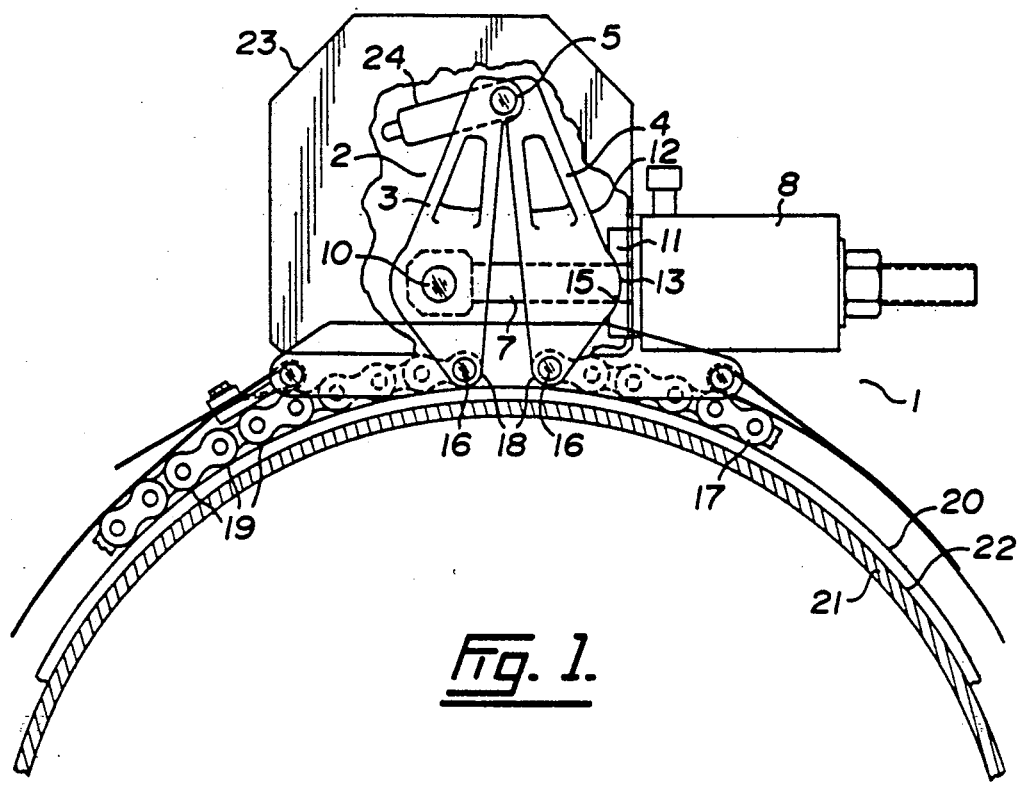
FIG. 1 is a partly broken away side view of the tightener, comprising a clamp, chain and cylinder, mounted on a shell and pipe assembly with the chain in a tensioned state, some of the parts being shown in shadow lines.
Figure 2:
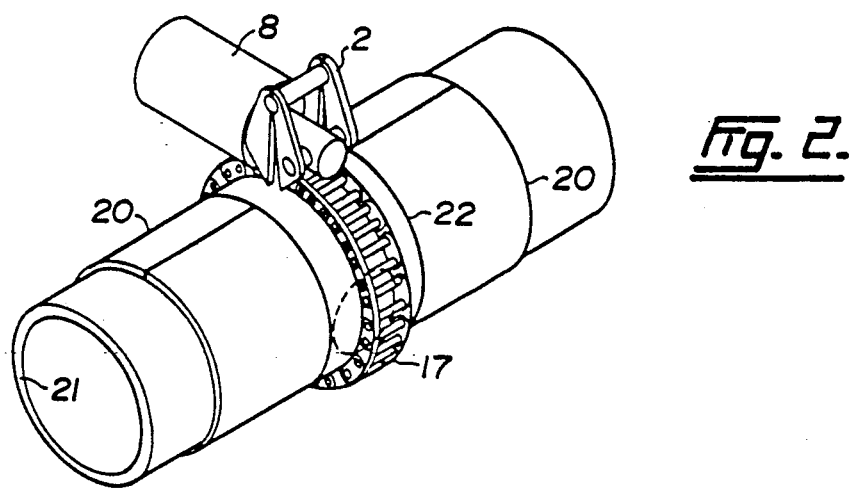
FIG. 2 is a simplified rear perspective view of the tightener mounted on the shell and pipe assembly.
Figure 3:
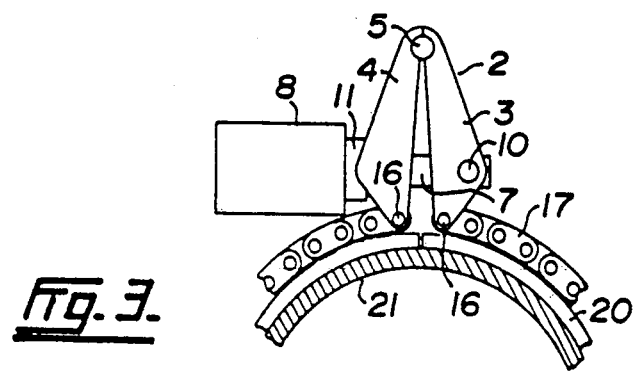
FIG. 3 is a simplified side view showing the clamp in operation.
Figure 4:
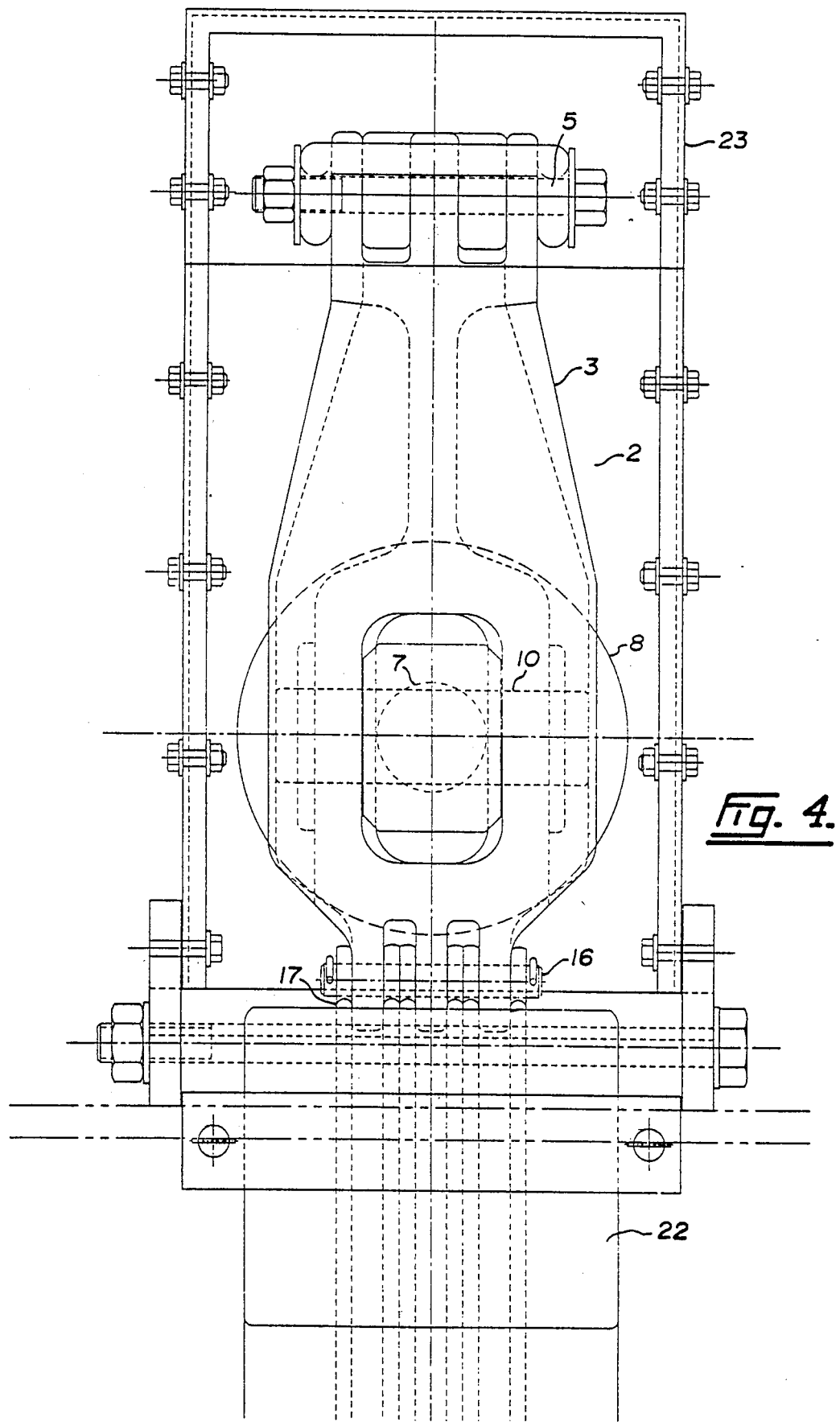
FIG. 4 is a front view of the front arm of the clamp, showing the clevis, rod and arm pins, and the rod of the cylinder.

The tightener 1 comprises a clamp 2 having a pair of jaws or arms 3,4 pivotally connected at their upper ends by a pin 5. Each arm 3,4 is formed to provide a clevis 6 at its lower end. The rod 7 of a fluid-actuated cylinder 8 extends through the rear clevis 6 and is connected at its forward end by a pin 10 to the clevis 6 of the forward arm 3 between its ends. The cylinder 8 carries a support plate 11 at its forward end. The rear surface 12 of the rear arm 4 of the clamp 2 abuts the support plate 11.

The rear surface 12 of the rear arm is formed with a convex portion 13 and the front surface 14 of the support plate 11 is formed with a concave portion 15 that conforms with the portion 13. This "knuckle joint" arrangement permits the force from the hydraulic cylinder to be distributed equally and repeatedly to the clamp arms. This enables the clamp to be used with pipe and shells of different diameters.

The cylinder 8 is disposed to act generally perpendicularly relative to the arms 3,4.

At their lowest extremities, the arms 3,4 are each connected by an end pin 16 with one end of a loop 17 of leaf chain. When the loop 17 is just tensioned, the ends 18 of the loop 17 are spaced apart a distance substantially the same as the distance between the lobes 19 of the undersurface of the chain. Thus the inwardly directed loading of the tightening chain is substantially evenly distributed about the circumference of the shells 20 which are mounted on the pipeline 21. Strips 22 of Teflon* or the like are preferably provided between the shells 20 and the pipeline 21, to save the pipeline from scoring by the chain and to ease the advance of the chain as it is tightened.

designates a trade-mark

A lift lug 22 is connected with the upper ends of the arms 3,4 for handling the clamp 2.

A safety housing 23 encloses the arms 3,4 in case of breakage.

Conventional means, such as a hand-operated pump (not shown) will be connected with the cylinder 8 to actuate it.

The scope of the invention is set forth in the appended claims.

The Embodiments of the Invention in which an Exclusive Property or Privilege is claimed are defined as follows:

1. In combination:
a pipeline;
a pair of semi-circular shells mounted about the pipeline; and
a tightener for clamping the shells against the pipeline, said tightener comprising
a scissor clamp having a pair of arms pivotally connected at their first ends,
a loop of chain extending around the shells, the ends of the loop being pivotally connected with the second ends of the arms, whereby the arms may pull on the loop ends to tighten the loop about the shells, a fluid-actuated cylinder, pivotally connected with the first arm between its ends, for biasing the first arm toward or away from the second arm, said cylinder being arranged generally perpendicularly to the arms and being spaced out of contact with the chain, said second arm abutting and being supported by the front end of the cylinder.

2. The combination as set forth in claim 1 wherein:
the cylinder carries a support plate at its front end,
the rear surface of the second arm abuts the front surface of the support plate, and
the abutting portions of the second arm rear surface and the front surface of the support plate have mating curved surfaces.

* * * * *